A. G. Batchelder,
Fruit Parer.
No. 103,830.
Patented June 7, 1870.

Witnesses:
S. N. Piper
L. N. Miller

A. G. Batchelder,
by his attorney
R. H. Eddy

UNITED STATES PATENT OFFICE.

ASAHEL G. BATCHELDER, OF LOWELL, MASSACHUSETTS.

IMPROVED MACHINE FOR PARING FRUIT AND VEGETABLES.

Specification forming part of Letters Patent No. 103,830, dated June 7, 1870.

*To all persons to whom these presents may come:*

Be it known that I, ASAHEL G. BATCHELDER, of Lowell, of the county of Middlesex and State of Massachusetts, have invented a new and useful invention having reference to Machines for Paring Fruits or Vegetables; and do hereby declare the same to be fully described in the following specification and represented in the accompanying drawing, of which—

Figure 1:
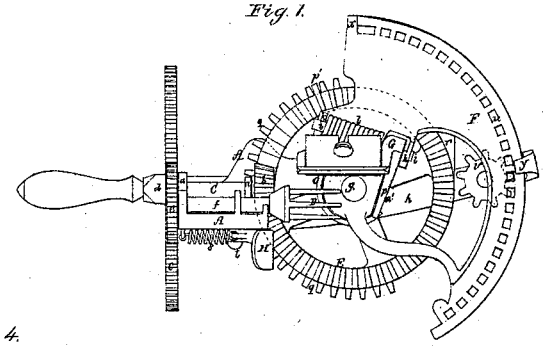
Figures 2, 5, 6:
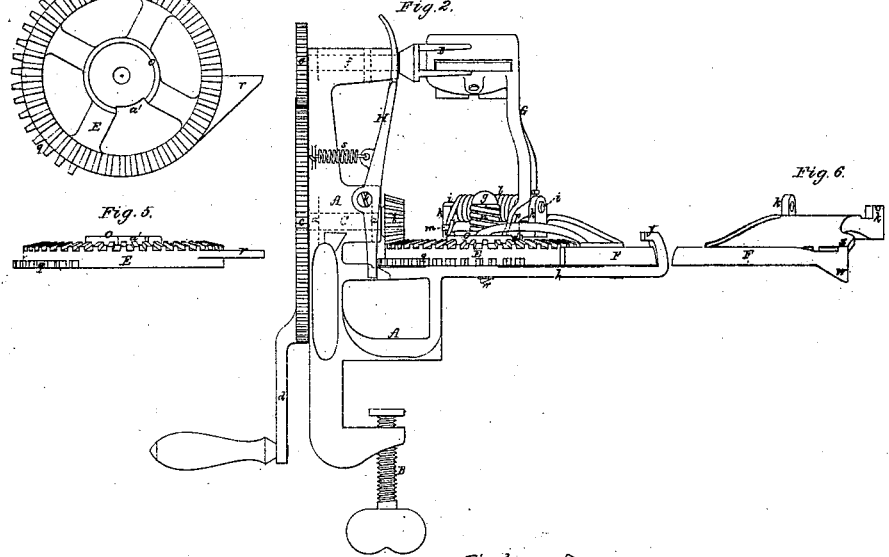
Figure 3:
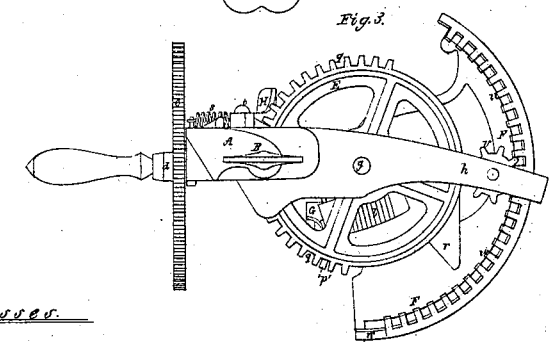

Figure 1 is a top view, and Fig. 2 a front elevation, of an apple-parer provided with my invention. Fig. 3 is a bottom or under-side view of it.

My invention has reference to mechanism for returning or restoring to its position, to commence the paring of an apple, fruit, or vegetable, the knife, immediately after an apple, fruit, or vegetable may have been pared. Instead of the knife-carrier having a continuous rotary motion imparted to it, it has a reciprocating rotary motion, and is not retracted by a spring, as in other machines, but is returned by a mechanism which restores it to place without any such concussion as generally results when a spring is employed.

In the drawing, A denotes the frame of the machine, as provided with a clamp-screw, B, for fixing it to a bench or table. This frame supports, in proper bearings $a$ $a$, a driving-shaft, C, provided at its inner end with a beveled pinion, $b$. The said shaft also has a spur-gear, $c$, fixed on it, which is furnished with a crank, $d$, and engages with a pinion, $e$, fixed on the rotary fork-shaft $f$, arranged at the upper part of the frame. The fork for supporting and revolving an apple while being pared is shown at D. The beveled pinion $b$ engages with a beveled table-gear, E, supported on a pivot or pin, $g$, which is erected on an arm, $h$, making part of the frame A.

In the paring-machine described in Letters Patent No. 87,322, dated March 2, 1869, and granted to me, the lever for supporting the knife stock or frame is represented as pivoted to the table-gear, so as to revolve continuously with it, such lever being operated in other respects by a helical spring and by a cam, the latter being fixed to or making part of the arm for supporting the table-gear. In my present machine the lever for supporting the knife is not pivoted to the table-gear, but to an internal-toothed sector, F, which turns on the pivot or pin $g$ of the table-gear, and is arranged directly over and so as to extend beyond the table-gear, in manner as represented in the drawing. In such drawing the knife carrier or lever is shown at G, its shaft or fulcrum being exhibited at $i$ as resting in bearings $k$ $k$, projecting upward from the sector. The retractive spring $l$ of the knife-carrier encompasses the fulcrum thereof and is hooked around the carrier, and also about a stud, $m$, extended from the sector. A helical spring, $n$, arranged on the pivot or pin $g$, and directly underneath its head, presses against the latter and down upon the hub of the sector. Furthermore, the table-gear is furnished with a cam, $o$, for operating the knife-carrier, whose lower arm, $p$, rests on the said cam.

Figure 4:
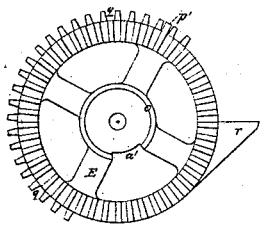

Fig. 4 of the drawing is a top view, and Fig. 5 a side or edge elevation, of the table-gear and its cam $o$, the purpose of such cam being to cause or aid in causing the knife, after having pared an apple, to be moved away therefrom, and to be maintained away therefrom most of the time during the return movement of the knife, the same being for the purpose of enabling the discharger or lever H to cast the apple off the fork without any impediment from the knife stock or carrier.

One of the teeth of the table-gear is extended beyond the periphery of such gear in manner as represented, so as to constitute an ear or projection, $p'$, and the table-gear also has an arc, $q$, of spur-gear teeth, formed on its periphery, the arc being a little greater than a semi-circumference of a circle. Furthermore, there is a cam, $r$, extended from the periphery of the table-gear, the purpose of such cam being to actuate the discharger H in one direction, such discharger being provided with a retractive spring, $s$, for pulling it back to its rearmost position. The discharger H, arranged as represented in the drawing, is a lever pivoted to the frame A, the pivot or fulcrum being shown at $t$.

The sector F has a row of internal gear-teeth, $u$, to engage with a pinion, $v$, pivoted to the arm of the frame, and arranged relatively to the table-gear in manner as represented. The sector also has a cam, $w$, extended down from it at or near one extremity of its arc. Directly over this cam there is a shoulder, $x$, formed on the sector. The said shoulder and cam are particularly exhibited in Fig. 6, which is an edge view of the sector.

The arm $h$ is provided with a hook, $y$, to extend around and embrace the toothed sector in manner as shown in Fig. 2.

On revolving the driving-shaft of the machine the fork will be put in revolution, and when supplied with the apple the latter will be revolved with the fork. The table-gear will have a continuous rotary motion imparted to it, and the knife will be turned half around the apple, the sector, in the meantime, being caused, by the stud or projection $p'$, to move with the table-gear. While the apple is being pared the arc of spur-teeth of the table-gear will not be in engagement with the pinion $v$, which, in the meantime, will be in engagement with and will be revolved by the internal gear-teeth of the sector.

On or immediately after completion of the paring of the apple the cam $w$ of the toothed sector will be forced against the arm $z$, and, continuing to move, will raise the sector above the stud $p'$, so as to enable the table-gear to continue its motion without carrying the sector with it. The advance motion of the sector will be checked or estopped by the shoulder $x$ and the hook $y$, the shoulder being carried against the hook. The table-gear will now be engaged with the pinion $v$, and, continuing to revolve, will turn such pinion so as to cause it to impart a return movement to the sector. During the return movement of the sector the knife-lever will be actuated by the cam $o$, and the cam $r$ of the table-gear will operate the apple-discharger, so as to cause it to force the apple from the fork.

While the sector is in its return, it, by the action of the knife-lever, its spring $l$, and cam $o$, will be kept up out of the way of the projection or stud $p'$; but, on the completion of the return movement of the sector, the foot of the knife-lever will drop into the space $a'$ between the ends of the cam $o$, in which case the spring $l$ will be free to advance the knife-lever, so as to force the knife up to its position to commence to pare. The spring on the pivot of the table-gear and sector will also depress the latter, in order to enable it to be again moved by the projection $p'$. When the sector has attained half of its return movement the discharger will be advanced and will cast the apple off the fork.

The clamp-screw or clamping devices of the frame of the above-described machine are not to be considered as entering into or making part of my invention, as they are common to other apple parers and machines.

I claim—

1. The combination and arrangement of the toothed sector F and its operative mechanism, substantially as described—viz., the projection $p'$, the toothed arc $q$, the pinion $v$, the cam $w$, shoulder $x$, hook $y$, and the spring $n$.

2. Also, the combination and arrangement of the toothed sector F and its operative mechanism with the table-gear E and the knife-lever G, its spring and cam, and with the discharger H, provided with mechanism for actuating it, as and for the purpose as explained.

3. Also, as my invention, an apple-paring machine composed of instrumentalities substantially as described, whereby, by whose operation, an apple may be revolved and pared, and subsequently be ejected from the fork of the machine, and the operative parts be restored to their places or normal positions, ready for effecting the paring and discharging of another apple.

ASAHEL G. BATCHELDER.

Witnesses:
R. H. EDDY,
S. N. PIPER.